UNITED STATES PATENT OFFICE.

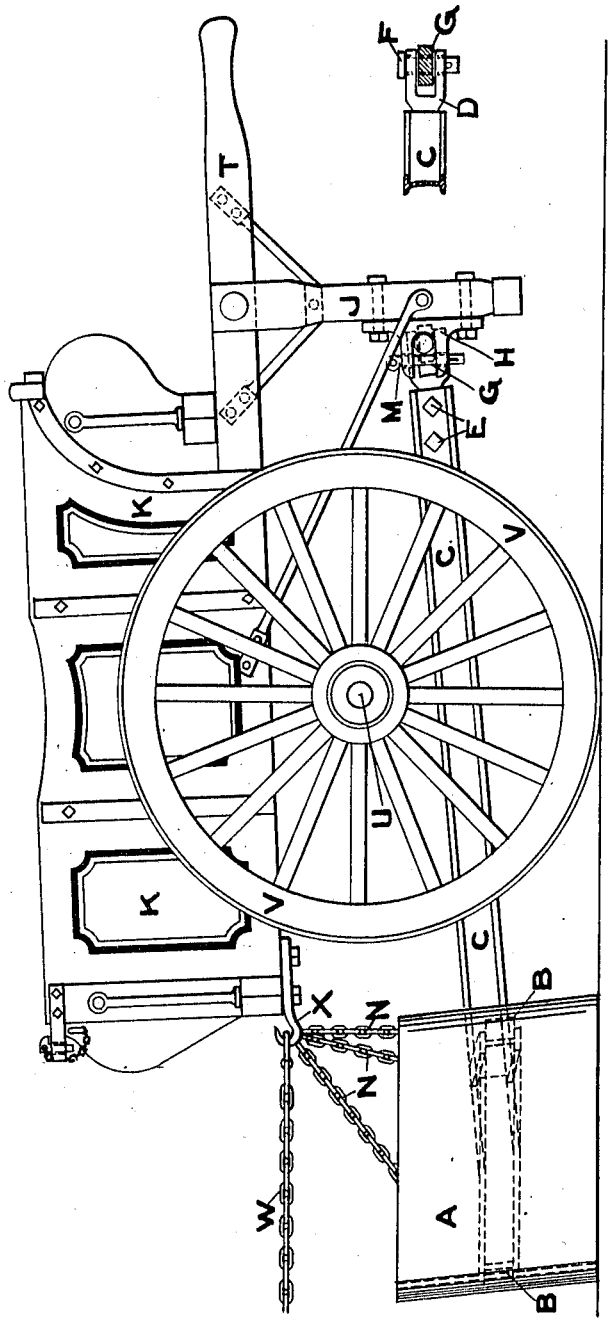

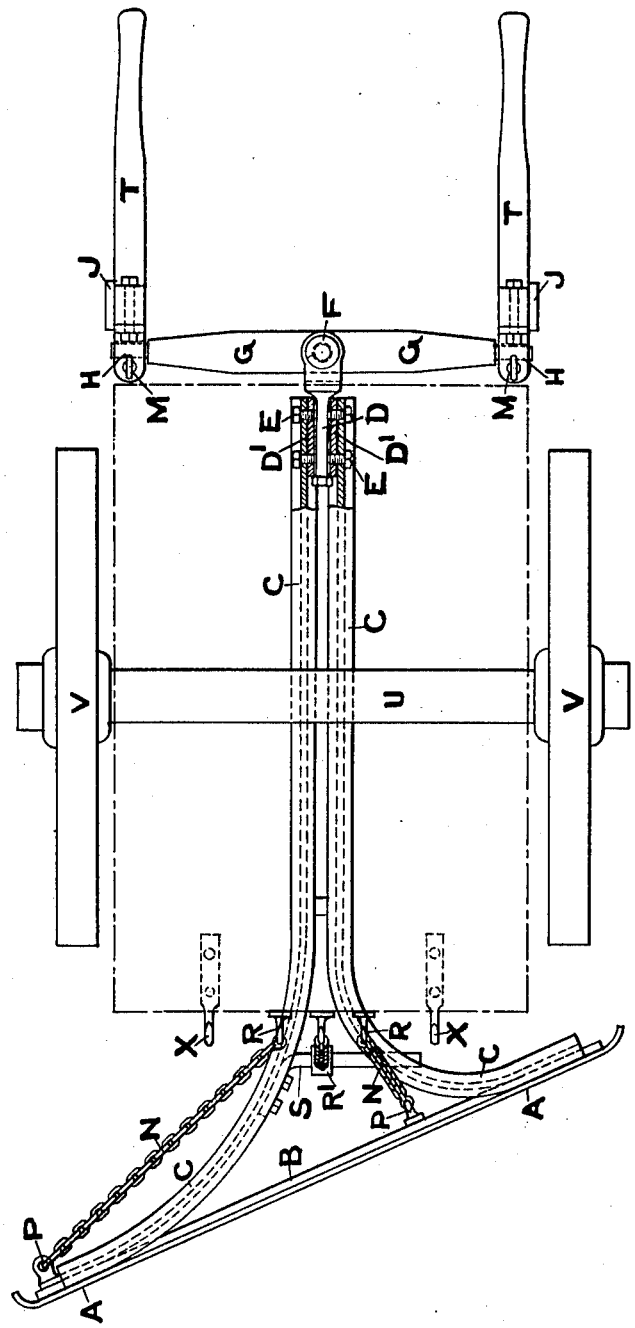

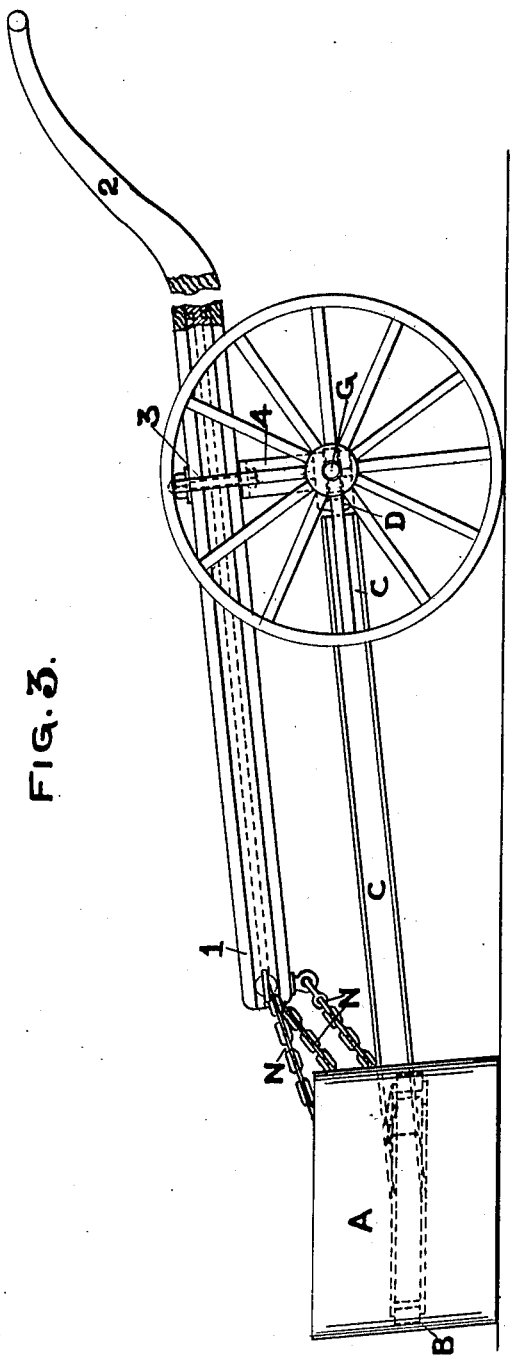

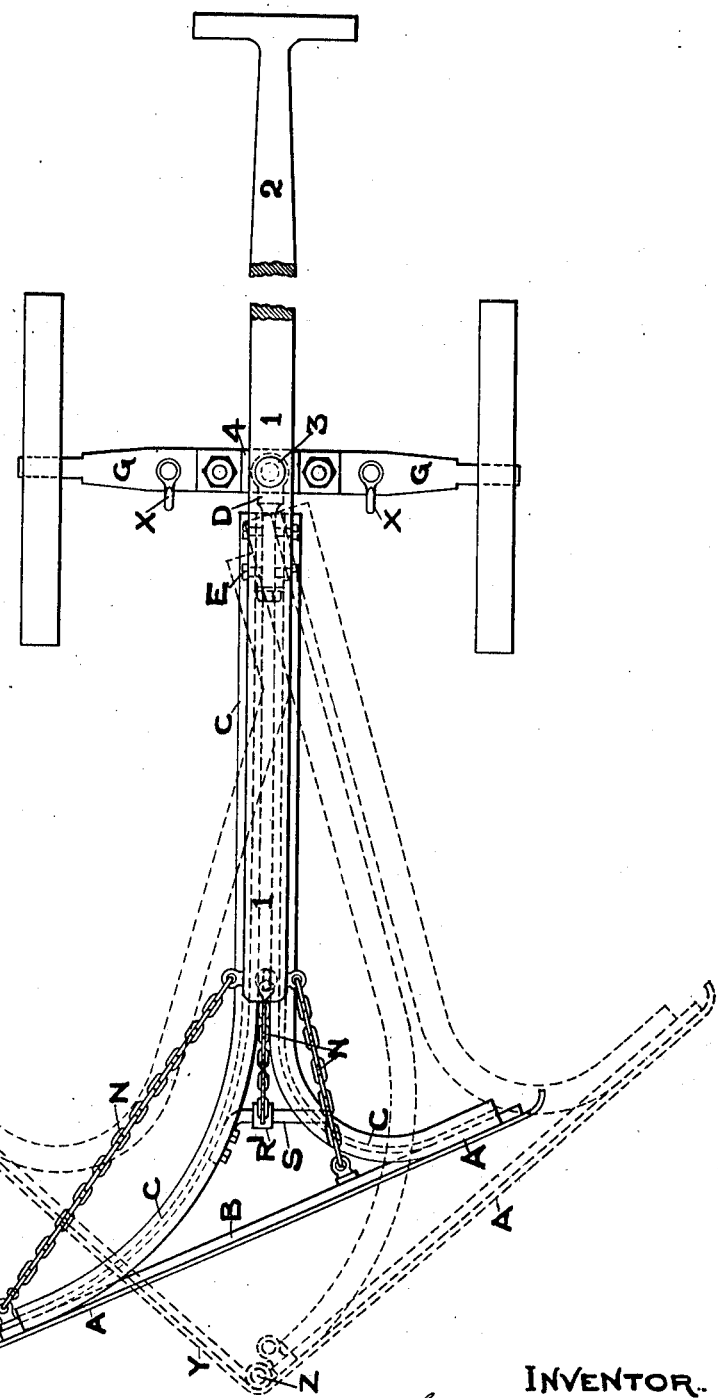

SAMUEL SUTCLIFFE, OF MYTHOLMROYD, ENGLAND.

SNOW-PLOW.

1,020,727.   Specification of Letters Patent.   Patented Mar. 19, 1912.

Application filed December 14, 1910. Serial No. 597,338.

*To all whom it may concern:*

Be it known that I, SAMUEL SUTCLIFFE, a subject of the King of Great Britain, residing at Mytholmroyd, in the county of York, England, have invented new and useful Improvements in and Relating to Snow-Plows, of which the following is a specification.

This invention relates to snow plows more especially for use in removing snow from foot-paths and the adjacent channels, and is constructed so that said plow may be temporarily coupled with the ordinary hand road carts generally employed in road repairing by urban and rural district councils, or it may be secured to a separate framework mounted on wheels and manipulated by means terminating in a swan-neck handle.

My improved plow may be adjustable or extensible so as to deal with varying widths of foot-paths, or for the purpose of making a cart or wagon track in a road, and the plow blade is reversible so that after clearing the footpath it may clear the adjoining channel on the return journey.

According to my invention, I preferably construct my improved plow of iron placed at the desired angle and secured to a channel iron frame. The frame is connected by a universal or the like coupling, with a cross tree or girder clipped or otherwise secured to the legs of the cart; while at the reverse end the plow is partly supported or suspended by chains attached by hooks to the cart. These chains also counteract any tendency of movement in a lateral direction by the plow when in use, yet enable an easy and quick manipulation of the plow by the attendant either in a lateral direction or when reversing. For adjustment the plow is raised or lifted clear of the ground by depressing the cart shafts or handles, the axle of the cart serving as the fulcrum.

The cart and plow are drawn by one or two horses hitched to the cart in front, and the plow is manipulated by the attendant holding the shafts or handles of said cart, or beam.

I attain these objects by the mechanism illustrated in the accompanying drawings, in which—

Figure 1 is a side elevation of a hand cart such as is employed by urban and rural district councils, with my improved snow plow fixed in position. Fig. 2 is a plan view of Fig. 1. Fig. 3 is a side elevation of my improved snow plow mounted upon its own wheels, or self contained. Fig. 4 is a plan view of Fig. 3, showing in dotted lines the extension of the plow for making a wagon track in roads.

Similar letters refer to similar parts throughout the several views.

In constructing my improved snow plow, I form the customary blade or plow-share A of metal of any desired depth and thickness, and attach thereto a stiffening strip B. I secure the plow A upon a suitable frame C formed preferably of bent rolled iron girders within which at one end is mounted a universal or the like coupling or stud D free to turn within a sleeve D' which is fixed to the frame C by bolts or set screws E. This coupling also hinges or pivots at F upon a cross tree or girder oscillating and supported in bearings H upon the legs J of the cart K. Cotters M facilitate the fixing and retention of the girder G within the bearings H.

In order to exercise full control over the plow when in use, and counteract any lateral stress which may be put upon same, I suspend the plow from the cart by means of short chains N, N, attached to eyebolts P P upon the plow, and to hooks R upon the cart.

R' is an arm adjustable upon the rod S for balancing the plow in order to create a uniform effect along its whole face.

The action is as follows: When the plow is in position for use, see Fig. 1, the attendant simply guides the same simultaneously with the guidance of the cart. Should he encounter an obstacle on the foot-path, such as a lamp post, he depresses the cart shafts or handles T, the legs J being short enough to enable him to do so, and the axle U of the wheels V acting as the fulcrum causes the plow A to be raised clear of the ground, and by means of the chain connections N, N, any turning of the cart has a corresponding effect upon the plow and guides it clear of such obstacle as desired. By depressing the cart shafts still farther, the plow is so raised that the frame C can be twisted or turned about the coupling or stud D, to invert the plow blade for the return journey; so that in addition to clearing the foot-path of snow the operation is continued to clear the adjacent channel on its return journey.

The plow is drawn by one or two horses as desired, by means of chains W attached to hooks X upon the cart.

For forming a wagon track in the road my improved plow may be readily adapted by connecting thereto an extension Y shown in dotted lines at Fig. 4, the chains N, N, being suitably connected to both sections of the plow and the cart or the like, for the purposes before described; but in this case I prefer to connect the draw chains W to an eyebolt Z serving as the connecting means or hinge between the aforesaid sections, and situated at the apex of the latter. Also I may dispense with the use of the road cart aforesaid and make the cross tree or girder G serve as an axle, and mount the same upon wheels, see Figs. 3 and 4. In this case the plow will be manipulated by a beam or bar 1 terminating in a swan-neck handle 2, said beam being secured at 3 to a bent frame or pedestal 4 bolted to the cross-tree G. The frame 4 is for elevating the beam 1 in order to get the desired purchase for lifting the plow clear of the track. The self contained plow is drawn by chains W secured to hooks X or the like upon the cross tree G.

By lifting the handle or handles more or less pressure is put upon the plow-share A, consequently a greater or lesser grip upon the road surface is obtained.

It may be noted that the cart body or floor part thereof of Figs. 1 and 2 serves the same purpose as the bar 1 of Figs. 3 and 4, and is essentially in its relation to the plow and its frame, a bar.

What I claim as my invention, and desire to secure by Letters Patent, is:—

1. A snow plow comprising a plow share, a frame supporting the same, a swiveling stud connected to the frame, a cross bar connected to the stud and traction means connected to the cross bar, a bar supporting the frame and chains extending between the bar and the plow.

2. A snow plow comprising a plow share, a frame supporting the same, a swiveling stud connected to the frame, a cross bar connected to the stud and traction means connected to the cross bar, a bar supporting the frame and chains extending between the bar and the plow share.

In testimony whereof I have signed my name to this specification in the presence of two subscribing witnesses.

SAMUEL SUTCLIFFE.

Witnesses:
 ABM. REED,
 WILFRED ALDERSON.